United States Patent
Seyferth et al.

[15] 3,694,477
[45] Sept. 26, 1972

[54] METHOD FOR MAKING ORGANO(FLUOROMETHYL) MERCURY COMPOUNDS

[72] Inventors: Dietmar Seyferth, Lexington; Steven P. Hopper, Cambridge, both of Mass.; Kirk V. Darragh, Nyack, N.Y.

[73] Assignee: Massachusetts Institute of Technology, Cambridge, Mass.

[22] Filed: Nov. 3, 1970

[21] Appl. No.: 86,637

[52] U.S. Cl. ............... 260/433, 260/431, 260/648, 260/653
[51] Int. Cl. .............................................. C07f 3/12
[58] Field of Search ........................... 260/431, 433

[56] References Cited

UNITED STATES PATENTS

| | | | |
|---|---|---|---|
| 3,501,283 | 3/1970 | Braxton et al. | 260/433 X |
| 2,502,222 | 3/1950 | Kaplan et al. | 260/433 |
| 2,502,382 | 3/1950 | Kaplan et al. | 260/433 |

OTHER PUBLICATIONS

Chemical Abstracts, Vol. 66 (1967) 94449r– 94452m
Chemical Abstracts, Vol. 70, 47596j (1969)
Seyferth et al, J. Organometal. Chem Vol. 4 pp. 127–137 (1965)

Primary Examiner—Delbert E. Gantz
Assistant Examiner—H. M. S. Sneed
Attorney—Kenway, Jenney & Hildreth

[57] ABSTRACT

Organo(fluorohalomethyl) mercury compounds are prepared by fluorinating with an organomercuric fluoride, a compound of the formula:

$$RHgCX_3$$

wherein R is an organo radical, X is chlorine or bromine and the X's can be the same or different. Reaction is carried out at a temperature of at least 0° C. but at a temperature below which substantial dihalocarbene forms. The organo(fluorohalomethyl)-mercury product is useful as a fluorohalocarbene donor and is used in the preparation of gem-difluorocyclopropanes and gem-fluorohalocyclopropanes.

11 Claims, No Drawings

METHOD FOR MAKING ORGANO(FLUOROMETHYL) MERCURY COMPOUNDS

This invention relates to the method for making phenyl(fluoromethyl)mercury compounds by a fluorination process.

Organo(trihalomethyl)mercury compounds, particularly phenyl(trihalomethyl)mercury compounds, are highly effective for forming dihalocarbene in situ. This characteristic permits their reaction with base-sensitive and/or weakly nucleophilic olefins to form the respective gem-dihalocyclopropanes. The gem-dihalocyclopropanes thus produced have many uses. For example, the gem-dihalocyclopropanes formed from ketene acetals are readily pyrolyzed to alpha-organo acrylic esters in the manner shown in the Journal of American Chemical Society, Volume 81, page 2,579 (1959). In particular, difluorocarbene sources have been used in the formation of birth control steroids and anti-inflammatory steroids as described in U.S. Pat. Nos. 3,492,318 and 3,457,285.

Prior to the present invention, it was thought that the reaction of an organomercuric halide and an organo(trihalomethyl)-mercuric compound involved the extrusion of a dihalocarbene from the trihalo compound and the subsequent insertion of the dihalocarbene into the mercury-halogen bond of the organomercuric halide molecule. Therefore, it was deemed essential to operate at a reaction temperature sufficiently high to ensure initial dihalocarbene extrusion. Generally, the reaction temperatures employed were at about 80° C. Thus, it has been known, prior to this invention, to react phenyl(dichlorobromoethyl)-mercury with phenylmercuric fluoride to form phenyl(dichlorofluoromethyl)-mercury at about 80° C. Unfortunately, when conducting the reaction under these temperature conditions, major side reactions resulting in the formation of phenyl(trichloromethyl)mercury drastically reduced the yield of the desired phenyl(dichloroflouromethyl)mercuric compound. This process was deemed undesirable due to the low yields of phenyl(dichlorofluoromethyl)mercury obtained.

The present invention provides a method for obtaining organo(fluoromethyl)mercury compound in high yields. It is based upon the discovery that organo(trihalomethyl)mercury compounds, wherein the halogen is either chlorine or bromine, can be fluorinated directly when reacted with an organomercuric fluoride. Moreover, it has been discovered that this reaction can be conducted at temperatures below which the dihalocarbene is evolved from the trihalomethyl reactant. The temperature employed depends upon whether the halogen constituent of the organo(trihalomethyl)mercury compound is chlorine or bromine. When it is desired to substitute fluorine for the bromine atoms of the organo(trihalomethyl)mercuric compound, the reaction is carried out at a temperature between about 10° and about 30° C. preferably between about 10° and about 25° C. On the other hand, when it is desired to substitute fluorine for one or more chlorine atoms of the organo(trihalomethyl)mercuric compound, the reaction is carried out at a temperature between about 50° C. and about 100° C., preferably between about 70° C. and about 100° C. When operating at the temperatures specified for the bromo and chloro reactants, substantially no dihalocarbene is formed in situ. That is, dihalocarbene is formed in an amount less than will cause significant secondary reaction.

The primary advantage of this invention is that the lower reaction temperatures drastically reduce the side reactions and therefore the yield and purity of the desired product is increased. Furthermore, the invention provides a simple procedure for obtaining effective difluorocarbene donors.

The organo(trihalomethyl)mercuric starting materials are represented by the following formula:

Wherein R is alkyl, substituted aryl or unsubstituted aryl including phenyl, naphthyl, diphenyl and condensed aromatic such phenanthryl, anthryl or the like which can be substituted, as for example with halogen or alkyl; X is chlorine or bromine and the X's can be the same or different. These compounds and a suitable method for their preparation are disclosed in the Journal of Organometallic Chemistry, 16 (1969) pages 21–26.

The organomercuric fluoride reactant can be made in any manner as for example by the process disclosed for phenylmercuric fluoride in the Journal of the American Chemical Society, 58, 2,653 (1936).

A preferred method for forming phenylmercuric fluoride is to react phenylmercuric acetate with approximately 2 moles of an alkali metal hydroxide in a water-benzene solvent at room temperature. The phenylmercuric hydroxide obtained from this reaction is then reacted with aqueous hydrofluoric acid in an alcohol solvent to produce the phenylmercuric fluoride reactant. The exact nature of this product obtained by the process described below has not been fully defined. The product may be phenylmercuric fluoride or a hydrofluoric acid adduct thereof. The term "phenylmercuric fluoride" as employed herein is meant to include both phenylmercuric fluoride and the hydrofluoric acid adduct thereof.

In accordance with the present invention, any one of the monofluoro, difluoro or trifluoro compounds can be prepared. It is preferred to employ as the trihalomethyl starting material an organo(bromomethyl)mercuric compound having a number of bromine atoms corresponding to the number of fluorine atoms desired in the product. This is because the bromine-carbon bond is more reactive in this reaction than the chlorine-carbon bond and the substitution of fluorine atoms into the molecule is selective to replace the bromine atom rather than the chlorine atom at the lower reaction temperatures.

It is to be understood that the scope of the present invention includes a fluorination process whereby chlorine atoms of the trihalomethyl reactant are substituted with fluorine when conducting the reaction at the elevated temperatures set forth above. The present invention also includes a two-step process whereby the bromine atoms are replaced at the lower reaction temperatures and the chlorine atoms are replaced at the relatively high reaction temperatures. Regardless of the temperature conditions employed, the reaction mechanism is the same i.e., fluorination rather than insertion of the dihalocarbene into the phenylmercuric fluoride molecule.

The concentration of organomercuric fluoride reactant employed depends upon the degree of fluorination desired. When a monofluoro compound is desired, the fluoride concentration is between 1 and 3 moles per mole of trihalomethyl reactant. Wen a difluoro compound is desired, from 2 to 6 moles per mole of trihalomethyl reactant are employed. When a trifluoro compound is desired, from 3 to 10 moles per mole of trihalomethyl reactants are employed.

The reaction is carried out in a solvent inert to the reactants. Suitable solvents include aromatics such as benzene, toluene, xylene or the like; alkanes such as hexanes, heptanes, octanes, decanes, dodecanes, pentadecanes, octadecanes, eicosanes and the like; cyclohexane, petroleum ether, kerosene or the like.

It is preferred that the reaction be carried out in the presence of an acid to control its initiation. Without acid, it is difficult to predict when the reaction will initiate, and once initiated it proceeds very rapidly and exothermically. Wen the acid is employed in an amount greater than about 0.5 mole per mole of organomercuric fluoride, the reaction is initiated when the reactants are mixed and proceeds at a controllable rate. Any acid can be employed including Lewis acids or a proton donor. Hydrogen halides, particularly hydrofluoric acid, are preferred.

Reaction is complete usually within about 0.5 – 3 hours. During reaction, an inert atmosphere, such as a nitrogen atmosphere, preferably is maintained. The product is recovered as a solid such as by evaporation of the filtered reaction mixture to dryness and is purified in any conventional manner such as by recrystallization.

The following Examples illustrate the process of the present invention and are not intended to limit the same.

EXAMPLE I

Preparation of Phenyl (Trifluoromethyl) Mercury

A three-liter, three-necked Morton flask equipped with a conventional overhead mechanical stirrer and a nitrogen inlet tube was charged with 105g (330 mmole) of phenylmercuric fluoride, 1 liter of benzene and a solution of 52.9g (100 mmole) of phenyl-(tribromomethyl)mercury in 1 liter of benzene. To a 100 ml. beaker containing 40 ml. of toluene chilled to ca 0° C. was added 10 ml. of 48 percent aqueous hydrofluoric acid. Thereafter the hydrofluoric acid-toluene was added rapidly to the vigorously stirred reactants.

After an additional ½ hour of vigorous stirring during which the temperature was maintained less than 30°–35°C., the reaction mixture was filtered through a coarse fritted glass funnel to yield 94g white solids (81 percent of the expected phenylmercuric bromide and excess phenylmercuric fluoride). The solids were washed with 300 ml. of benzene and the combined filtrate and washings, after drying over anhydrous magnesium sulfate, was evaporated to dryness under the reduced pressure of a water aspirator.

The dried crude material was taken up in 800 ml. of boiling hexane and filtered while hot to separate solid phenylmercuric bromide. After boiling the solvent off to a volume of ca 600 ml., the mother liquor was slowly cooled to 10° C. to precipitate the product. Filtration yielded 20.4g of phenyl(trifluoromethyl)mercury, m.p. 141°–143° C. The mother liquor was evaporated to dryness and the remaining solid was crystallized, as above, from 50 ml. of hexane. Filtration yielded an additional 2.0g of phenyl(trifluoromethyl)mercury, m.p. 132° – 140° C. The combined crops, 22.4g (65 percent), of phenyl(trifluoromethyl)mercury had m.p. 141° – 143° C. after vacuum drying (ca 150 mm.) for 30 minutes. The product gave a superimposable infrared spectrum to previously characterized phenyl(trifluoromethyl)mercury.

An identical reaction to that above, using toluene as a solvent instead of benzene, gave 22.0g (64 percent) of phenyl(trifluoromethyl)mercury, m.p. 141° – 144° C. The solids filtered from the reaction weighed 101g (95 percent theoretical).

EXAMPLE II

Preparation of Phenyl (Dichlorofluoromethyl) Mercury

By a procedure identical to that described in Example I, 41.3g (130 mmole) of phenylmercuric fluoride in 200 ml. of benzene, 44.0g (100 mmole) of phenyl(bromodichloromethyl)mercury in 500 ml. of benzene and 3.3 ml. of 48 percent hydrofluoric acid in 15 ml. of icecold toluene were allowed to react in a 1 liter Morton flask. The reaction temperature was maintained below 30° – 35° C. after about 0.5 hour; the reaction mixture was filtered to yield 54g of slightly damp solids. Purification as in Example I, first from 800 ml. of hexane yielded 16.5 g. then from 150 ml. hexane yielded 5.7g, m.p. 91°– 94° C., and from 30 ml. hexane yielded 1.6g, m.p. 90° – 94° C. The combined product, 22.8g (60%), was identified as phenyl(dichlorofluoromethyl)mercury by its infrared spectrum and melting point of 91°– 94° C.

EXAMPLE III

Preparation of a Hydrofluoric Acid Adduct of

Phenylmercuric Fluoride

A three-liter, three-necked Morton flask equipped with a conventional overhead mechanical stirrer and a nitrogen inlet tube was charged with 118g (352 mmole) of phenylmercuric acetate, 27.2g (0.68 mmole) of sodium hydroxide pellets, 680 ml. of benzene and 680 ml. of distilled water. The reaction mixture was stirred vigorously at room temperature for 1.5 hours and the phenylmercuric hydroxide product was filtered through a large Buchner funnel. The last portions of solvent were removed by pressing the white solid down and continued aspirator sucking.

A 600 ml. Nalgene beaker was equipped with a magnetic stirring bar and charged with 350 ml. of ethanol. The slightly damp phenylmercuric hydroxide, after being broken up into a powder, was added to the well-stirred ethanol solution. To the stirred slurry was added 30g (720 mmole hydrofluoric acid) of 48 percent aqueous hydrofluoric acid and the slurry became turbid. The beaker was covered with a watch glass and stirring at room temperature was continued for 5.5 hours. After refrigeration overnight to about 10° C. the reaction mixture was filtered to yield 66.5g of product. The ethanol was concentrated by evaporation at the reduced pressures of a water aspirator to 150 ml., cooled overnight and filtered to yield 16.5g of product. The product had a m.p. of 166° – 170° C. and was identified as an approximately monohydrofluoric acid adduct of phenylmercuric fluoride.

EXAMPLE IV

By the procedure described in Example I, 18.4g (64.00 mmole) of phenyl mercuric fluoride in 60 ml. of benzene, 7.90g (20 mmole) of phenyl (trichloromethyl) mercury in 80 ml. benzene and 1 ml. of 48 percent hydrofluoric acid in 5 ml. of ice cold toluene were placed in a 250 ml. flask. No reaction occurred at the reaction temperatures employed in Example I. The reaction mixture then was heated to 90° C. for about 1.5 hours and then was cooled to room temperature and filtered to yield 19.4g. solids. Purification as in Example I, from 150 ml. hexane yielded 3.65g, (53 percent), m.p. 134 to 143° C. The product was identified as phenyl(trifluoromethyl)mercury by its infrared spectrum.

We claim:

1. A process for making an organo(fluorohalomethyl)-mercury compound of the formula:

$$RH_gCF_nX_{-n}$$

wherein R is selected from the group consisting of alkyl, aryl, haloaryl and alkaryl, $n$ is an integer from 1 to 3, X is chlorine or bromine and the X's can be the same or different which comprises reacting an organo(trihalomethyl) mercuric compound of the formula:

$$RH_gCX_3$$

and an organomercuric fluoride at a temperature of at least 0° C. to effect fluorination of said organo(trihalomethyl) mercuric compound, said reaction temperature being maintained sufficiently low to prevent substantial dihalocarbene formation.

2. The process of claim 1 wherein X is bromo, $n$ is 3 and the reaction temperature is maintained between about 0° C. and 35° C.

3. The process of claim 1 wherein X is chloro, $n$ is 3 and the reaction temperature is maintained between about 50° C. and 90° C.

4. The process of claim 1 wherein R is phenyl and the organomercuric fluoride is phenylmercuric fluoride.

5. The process of claim 2 wherein R is phenyl and the organomercuric fluoride is phenylmercuric fluoride.

6. The process of claim 3 wherein R is phenyl and the organomercuric fluoride is phenylmercuric fluoride.

7. The process of claim 1 wherein n is 3 and the X's are different which comprises as a first step maintaining the reaction temperature between about 0° C. and 25° C. to replace the bromine atoms of the organo(trihalomethyl)mercury with fluorine, and thereafter raising the reaction temperature between about 50° C. and 90° C. to replace the chlorine atoms of the organo-(trihalomethyl)mercury with fluorine.

8. The process of claim 1 wherein the reaction is carried out in the process of hydrofluoric acid.

9. The process of claim 2 wherein the reaction is carried out in the presence of hydrofluoric acid.

10. The process of claim 3 wherein the reaction is carried out in the process of hydrofluoric acid.

11. Phenyl(trifluoromethyl)mercury.

* * * * *